(12) United States Patent
Fukushima

(10) Patent No.: US 6,657,349 B2
(45) Date of Patent: Dec. 2, 2003

(54) AC SERVOMOTOR

(75) Inventor: Tetsuharu Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/843,417

(22) Filed: Apr. 26, 2001

(65) Prior Publication Data

US 2002/0047431 A1 Apr. 25, 2002

(30) Foreign Application Priority Data

Apr. 27, 2000 (JP) ........................................ 2000-128409

(51) Int. Cl.$^7$ ............................................... H02K 21/12
(52) U.S. Cl. ............................... 310/156.47; 310/156.45
(58) Field of Search ....................... 310/156.38, 156.43, 310/156.45, 156.67, 156.25, 51

(56) References Cited

U.S. PATENT DOCUMENTS

| | | | | |
|---|---|---|---|---|
| 4,009,406 A | * | 2/1977 | Inariba .......................... 310/112 |
| 4,782,259 A | * | 11/1988 | Shikama et al. ............... 310/113 |
| 4,823,038 A | * | 4/1989 | Mizutani et al. ......... 310/156.47 |
| 4,841,186 A | * | 6/1989 | Feigel et al. ............. 310/156.12 |
| 4,888,512 A | * | 12/1989 | Shimizu ....................... 148/104 |
| 5,034,642 A | * | 7/1991 | Hoemann et al. ............ 310/152 |
| 5,164,622 A | * | 11/1992 | Kordik ....................... 310/67 R |
| 5,220,228 A | * | 6/1993 | Sibata .................... 310/156.47 |
| 5,323,077 A | * | 6/1994 | Brandes ................. 310/156.47 |
| 5,773,908 A | * | 6/1998 | Stephens et al. ........ 310/156.47 |

* cited by examiner

*Primary Examiner*—Dang Le
(74) *Attorney, Agent, or Firm*—Frommer Lawrence & Haug LLP; William S. Frommer

(57) ABSTRACT

An AC servo motor in which annular polar anisotropic magnets, formed by splitting an anisotropic magnet into two or more portions in an axial line direction, are used in a rotor. The magnetic poles of the split annular polar anisotropic magnets are disposed so as to be shifted by a predetermined angle $\theta'$ which is greater than a skew angle $\theta$ determined based on the number of torque ripples per rotation of the rotor determined by the number of magnetic poles and the number of slots in a stator-side iron core. The predetermined angle $\theta'$ is the angle obtained after adding to the skew angle $\theta$ a value which takes into consideration magnetic interference between the magnets. The invention provides an AC servomotor which can be controlled with high precision as a result of reducing cogging torque generated between the magnet and the stator-side iron core.

3 Claims, 5 Drawing Sheets

AC SERVOMOTOR

BACKGROUND OF THE INVENTION

1. Field of the Invention

The present invention relates to an AC servomotor usable as an actuator of various industrial machines, such as robots, and, more particularly, to a small AC servomotor providing a high output.

Even more particularly, the present invention relates to an AC servomotor using a polar anisotropic magnet in a rotor. Still even more particularly, the present invention relates to an AC servomotor which is controllable with high precision as a result of reducing cogging torque produced between a magnet and a stator-side iron core.

2. Description of the Related Art

In general, a servomotor is used as an actuator of an industrial machine because a servomotor is easy to handle, is small, provides high torque, and is highly responsive. In particular, since an AC servomotor is brushless and does not require maintenance, it can be used as, for example, a joint actuator of an automatic machine which is desired to move in a working space without human intervention, such as a walking robot. In an AC servomotor, a permanent magnet is disposed at the rotor side, while a coil is disposed at the stator side. The AC servomotor generates a torque based on a sinusoidal magnetic flux distribution and by a sinusoidal electrical current.

For example, a small AC servoactuator applicable to a legged walking robot is disclosed in Japanese Unexamined Patent Publication No. 11-33386 which has already been assigned to the applicant. The servoactuator disclosed in the specification is a type directly connected to a gear and incorporates in a motor unit a servo control system formed into a one-chip system.

In particular, an AC servomotor used in an autonomous walking robot is required to be small and to provide high output, high speed, and a stable control operation. The stator side is constructed so that the wires are wound close together using a slit-core method, and a magnet having a high magnetic flux density is used at the rotor side in order to make it possible to reduce the size of the servomotor and to make it provide high output. (This is already well known by those skilled in the art.)

Depending on whether or not a magnetic field is applied when molding magnetic powder inside a mold, a magnet is classified as either an isotropic or an anisotropic magnet. More specifically, when a magnetic field is not applied during molding, the magnetic field inside the magnet becomes uniform or isotropic. In contrast, when a magnetic field is applied during molding, the magnetic field inside the magnet is oriented, that is, becomes anisotropic, thereby making it possible to obtain a high magnetic flux even if the magnet is small.

By the orientation of the magnetic field formed inside the magnet, an anisotropic magnet is classified as either a radial anisotropic magnet or a polar anisotropic magnet. FIGS. 1 and 2 schematically illustrate the orientation of the magnetic field inside an annular radial anisotropic magnet in a cross section thereof, and the orientation of the magnetic field inside an annular polar anisotropic magnet in a cross section thereof, respectively. In particular, since the polar anisotropic magnet has a high magnetic flux, it is an excellent magnet from the viewpoint of its high output. However, since the polar anisotropic magnet is magnetized in accordance with its magnetic path during molding and magnetization, one cannot set N/S poles on desired locations of the ring.

When a magnet having a high magnetic flux is used to achieve higher output, a torque ripple, called a "cogging torque," which is generated between the magnet and the stator-side iron core increases. Unless this torque ripple is reduced, the servomotor cannot be controlled with high precision, thereby making it impossible to realize higher performance which is required of an actuator.

It is known that cogging torque does not depend upon the windings of the stator, but that it is generated by changes in the magnetic flux that occurs as the magnetized magnet rotates with respect to a slot of the iron core of the stator.

In order to reduce cogging torque, a method of skewing (that is, tilting) the magnetic poles of the magnet is used. FIG. 3 illustrates a rotor in which a radial anisotropic magnet has been subjected to a skew magnetization operation. In the case of a radial anisotropic magnet, when such a magnet used in the rotor is magnetized, it is possible to skew each of the magnetic poles of the magnet as shown in FIG. 3.

However, in the case of the above-described polar anisotropic magnet, the direction of magnetization is determined by the formation of the magnetic field when the magnet is formed by molding, thereby making it difficult to subject it to a skew magnetization operation during the magnetization. Therefore, when a polar anisotropic magnet is used in order for the servomotor to provide high output, the problem of cogging torque remains.

For example, Japanese Unexamined Patent Application Publication No. 8-340652 discloses the reduction of cogging torque in an AC servomotor including an annular polar anisotropic magnet used in a rotor. More specifically, in the AC servomotor disclosed in the document, the annular polar anisotropic magnet used in the rotor is split into two or more magnets in an the axial line direction thereof, and the magnetic poles of each of the magnets are shifted by a predetermined skew angle θ and fixed in order to reduce cogging torque apparently by an effect similar to that obtained when a skew magnetization operation is carried out.

The skew angle θ should be set at an optimal value which causes the cogging torque to be a minimum. However, Japanese Unexamined Patent Application Publication No. 8-340652 does not particularly discuss at what value the skew angle θ should be set.

In the case of a radial anisotropic magnet, the angle which causes the cogging torque to be cancelled (that is, which causes opposite phases to be produced) can be used as the skew angle θ which is determined based on the number of torque ripples per rotation of the rotor determined by the number of magnetic poles of the annular magnet used in the rotor and the number of slots of the stator iron core.

For example, in the case where a magnet is a four-pole magnetization type magnet and has six slots in the iron core of the stator, when the rotor is constructed using one layer of an annular polar anisotropic magnet, twelve torque ripples are produced, with twelve being the least common multiple of the number of magnetic poles and the number of slots. In other words, the period of the cogging torque is 30 degrees. Therefore, by performing magnetization after the skew angle θ has been set at 15 degrees, which corresponds to half the period of the cogging torque, the torque ripples produced based on the number of slots in the iron core and by the magnet are such as to have opposite phases, and, thus, cancel each other, thereby minimizing cogging torque.

However, in a servomotor such as that disclosed in Japanese Unexamined Patent Application Publication No. 8-340652 in which an annular polar anisotropic magnet used in a rotor is split into two or more magnets in the axial line direction thereof, and the poles of the polar anisotropic magnets are shifted by a skew angle θ, the upper and lower annular polar anisotropic magnets magnetically interfere with each other at the boundary therebetween. This magnetic interference prevents the skew angle θ (which corresponds to half the period of the cogging torque) obtained by the above-described method from matching the optical angle which causes the cogging torques to cancel each other.

SUMMARY OF THE INVENTION

Accordingly, it is an object of the present invention to provide an excellent AC servomotor usuable as an actuator of various industrial machines including robots.

It is another object of the present invention to provide an excellent AC servomotor which is small and which provides high output.

It is still another object of the present invention to provide an excellent AC servomotor using a polar anisotropic magnet in a rotor.

It is still another object of the present invention to provide an excellent AC servomotor which can be controlled with high precision as a result of reducing cogging torque generated between a magnet and an iron core of a stator.

To these ends, according to the present invention, there is provided an AC servomotor using an annular polar anisotropic magnet in a rotor. In the AC servomotor, the annular polar anisotropic magnet is split into two or more annular polar anisotropic magnets in an axial line direction thereof. Magnetic poles of the corresponding split annular polar anisotropic magnets are disposed so as to be shifted by a predetermined angle θ' which is greater than a skew angle θ determined based on the number of torque ripples per rotation of the rotor determined by the number of magnetic poles of the annular magnet at the rotor side and the number of slots in a stator-side iron core.

In one form of the invention, the skew angle θ is, for example, equal to half the period of a cogging torque determined based on the number of torque ripples per rotation of the rotor determined by the number of magnetic poles of the annular magnet and the number of slots in the stator-side iron core. Ordinarily, the number of torque ripples generated per rotation corresponds to the least common multiple of the number of magnetic poles and the number of slots.

In another form of the invention, the predetermined angle θ' is an angle obtained by adding to the skew angle θ a value which takes into consideration magnetic interference between the split annular polar anisotropic magnets.

In still another form of the invention, the predetermined angle θ' is, for example, approximately ⁴⁄₃ times the skew angle θ which corresponds to half the period of a cogging torque determined based on the number of torque ripples per rotation of the rotor determined by the number of magnetic poles of the annular magnet and the number of slots in the stator-side iron core.

According to the AC servomotor of the present invention, even when an annular polar anisotropic magnet is used in the rotor, the cogging torque can be restricted to a minimum. More specifically, according to the present invention, it is possible to realize a servomotor having a small cogging torque and providing a high output.

As a result of restricting the cogging torque to a minimum, it is possible to provide an AC servomotor which is controllable with high precision. Such a servomotor which can provide high output and which is controllable with high precision can be used as a joint actuator in legged walking robots and other types of articulated robots. In particular, such a servomotor can contribute to the increasing of the performance of small robots.

Other objects, features, and advantages of the present invention will become manifest from a more detailed description with reference to an embodiment of the present invention described below and the attached drawings.

DESCRIPTION OF THE PREFERRED EMBODIMENT

Hereunder, a description of a preferred embodiment of the present invention will be given in detail with reference to the drawings.

Figure 1:
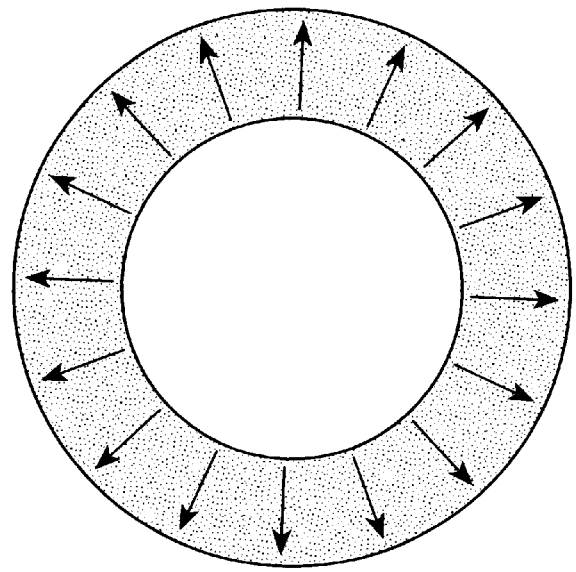
FIG. 1 illustrates the orientation of a magnetic field in a cross section of an annular radial anisotropic magnet.
Figure 2:
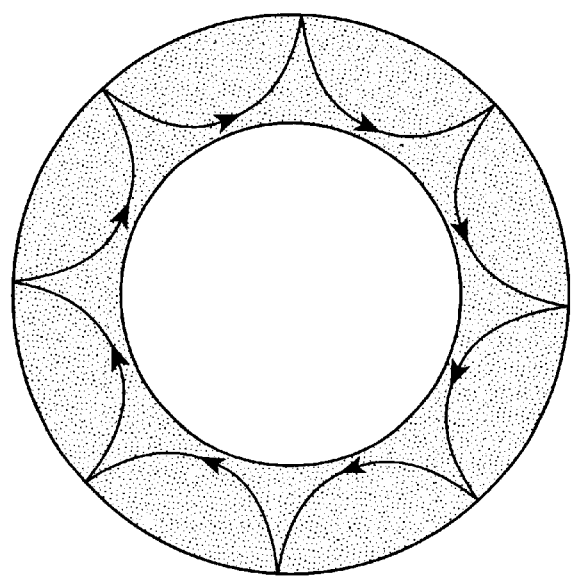
FIG. 2 illustrates the orientation of a magnetic field in a cross section of an annular polar anisotropic magnet.
Figure 3:
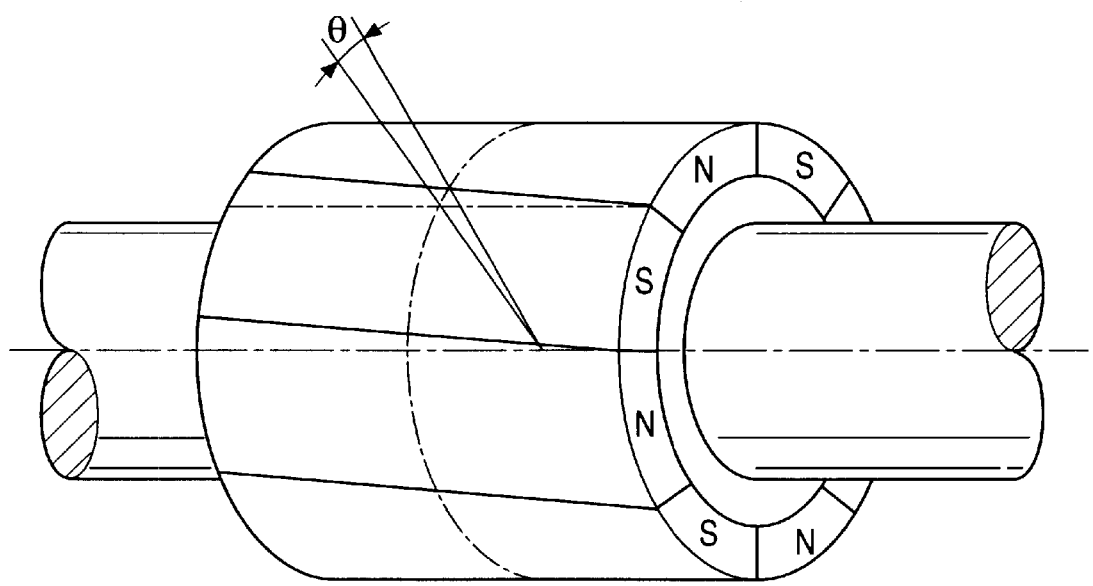
FIG. 3 illustrates a rotor in which the radial anisotropic magnet has been subjected to a skew magnetization operation.
Figure 4:
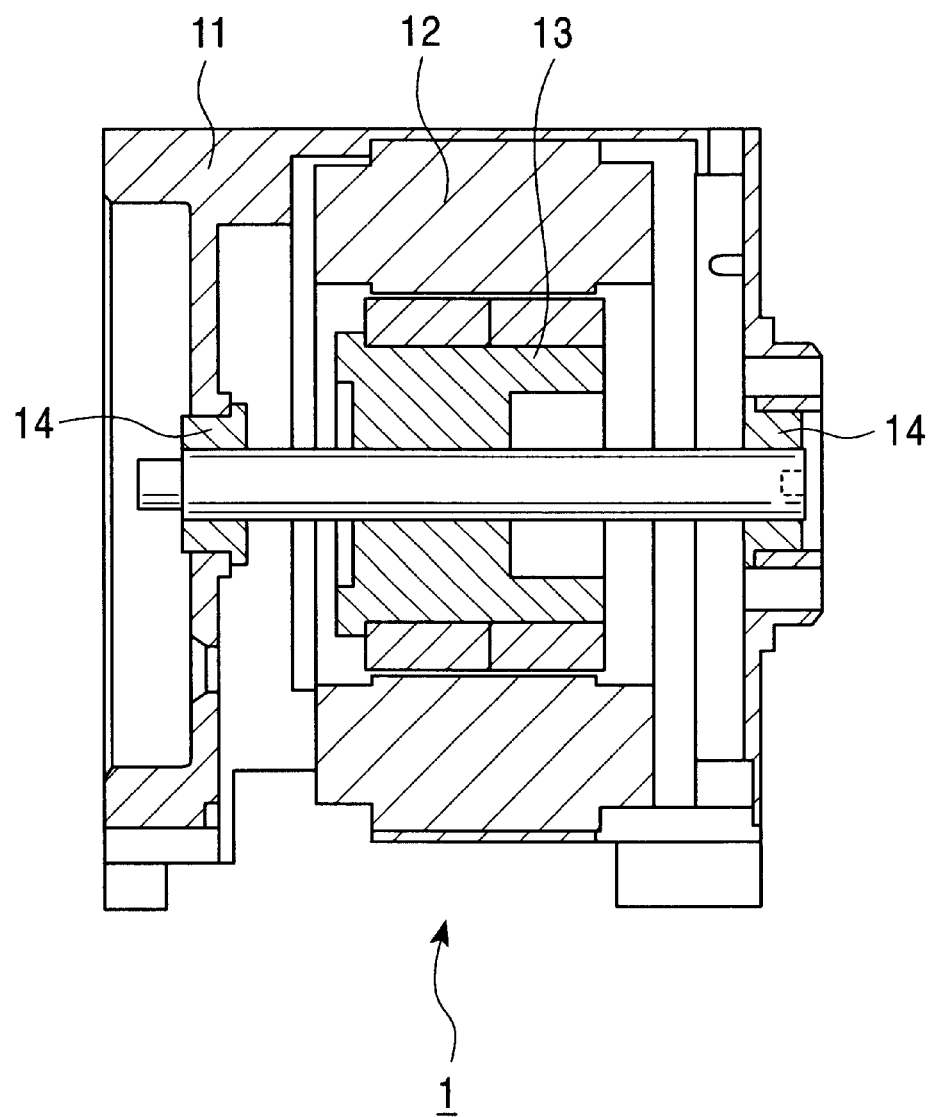
FIG. 4 illustrates the structure of a cross section of an AC servomotor 1 of an embodiment of the present invention in an axial direction thereof.

FIG. 4 schematically illustrates the structure of a cross section of an AC servomotor 1 of an embodiment of the present invention in an axial direction thereof.

As shown in FIG. 4, a stator iron core 12 having a plurality of slots is accommodated inside a case 11. At a hollow portion of the stator iron core 12, a rotor 13 is disposed so as be coaxial with the stator iron core 12. Both ends of the rotor 13 are rotatably supported by corresponding bearings 14 at its shaft.

Figure 5:
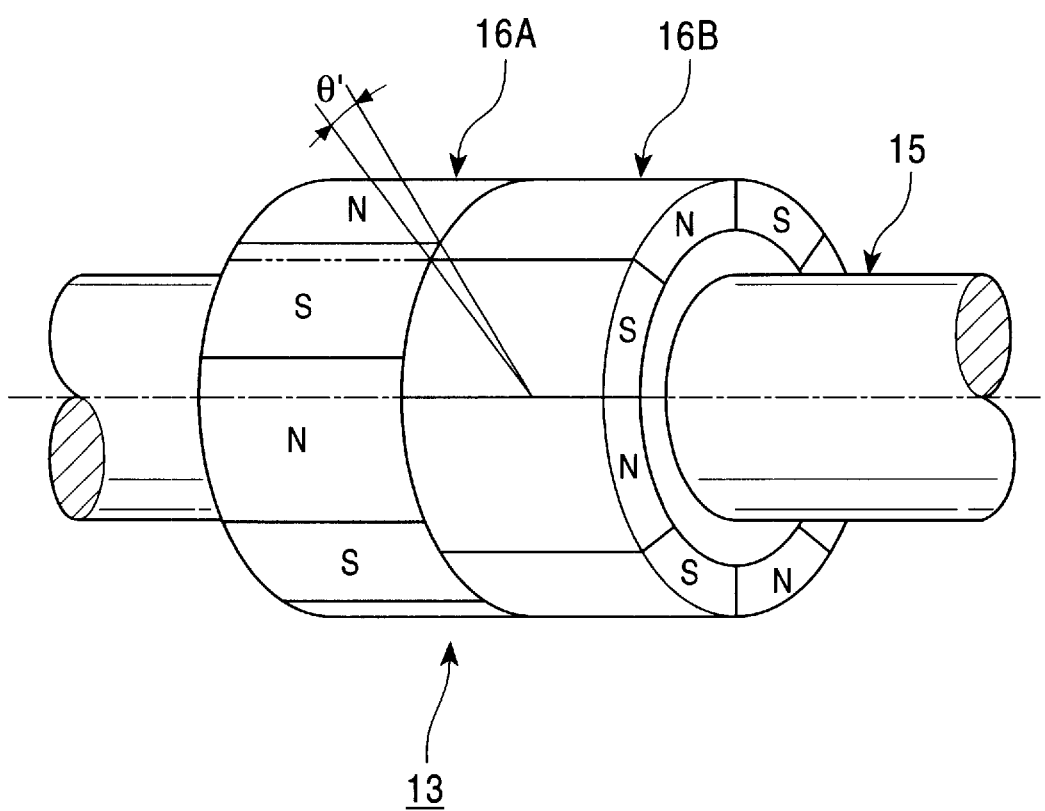
FIG. 5 illustrates the peripheral portion of a magnet in a rotor 13 used in the AC servomotor 1 of the embodiment of the present invention.

FIG. 5 illustrates the peripheral portion of a magnet of the rotor 13 used in the AC servomotor 1 of the embodiment of the present invention. As shown in FIG. 5, the rotor 13 is constructed by adhering and securing two annular magnets 16A and 16B, split in an axial direction of the magnet, to a shaft 15. The two annular magnets 16A and 16B have polar anisotropic properties, and are disposed such that their magnetic poles are shifted by a predetermined skew angle θ'.

A polar anisotropic magnet is small, but has a high magnetic flux density. Therefore, by using an annular polar anisotropic magnet 16 in the rotor 13, the AC servoactuator 1 can realize high output.

In the embodiment, the annular polar anisotropic magnets 16A and 16B of the rotor 13 have eight magnetic poles. The stator iron core 12 has twelve slots.

Here, the method of calculating the optimal skew angle θ in the conventional radial anisotropic magnet (having eight magnetic poles and twelve slots) will be given. In this case, 24 torque ripples are generated during one rotation (of 360 degrees) of the rotor 13, with the number of torque ripples corresponding to the least common multiple of the number of magnetic poles and the number of slots. In other words, the torque ripples are produced in a 15-degree period. Therefore, in order to minimize cogging torque, it is necessary to determine the skew angle θ so that it makes it possible for the generated cogging torques to have opposite phases and cancel each other. In this case, the optimal skew angle corresponds to half the period of the cogging torque, which is equal to 7.5 degrees.

In the embodiment, in order to cause the motor to provide high output, a polar anisotropic magnet is used instead of a radial anisotropic magnet. More specifically, even if the two polar anisotropic magnets 16A and 16B, split in the axial direction, are shifted by the skew angle θ (=7.5 degrees), which is determined based on the number of torque ripples per rotation of the rotor 1 determined by the number of slots in the stator-side iron core and the number of magnetic poles of the annular magnets, the cogging torque does not become a minimum. This is because magnetic interference occurs at the boundary between the magnets 16A and 16B. In other words, it becomes difficult to control the AC servomotor 1 with high precision, thereby making it impossible to achieve high performance which is required of an actuator.

Figure 6:
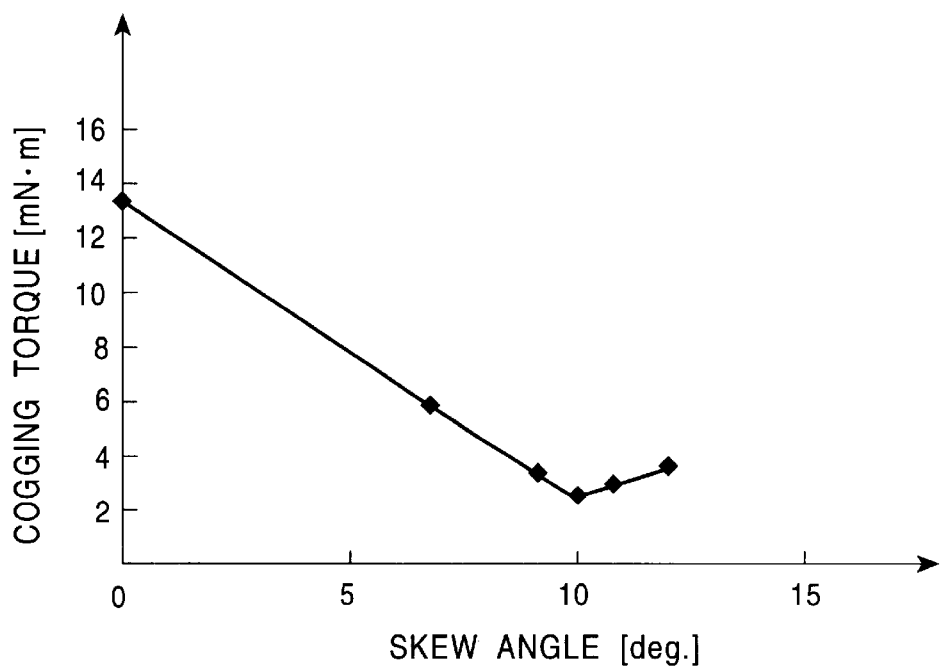
FIG. 6 is a graph showing the relationship between the cogging torque and the skew angle when annular polar anisotropic magnets 16A and 16B, formed by splitting the magnet into two in the axial direction thereof, are used in the rotor 13. (Here, the number of magnetic poles is eight, and the number of slots is twelve.)

FIG. 6 is a graph showing the relationship between the cogging torque and the skew angle when the annular polar anisotropic magnets 16A and 16B, formed by splitting the magnet into two in the axial direction of the magnet, are used. Here, the annular polar anisotropic magnets 16A and 16B of the rotor 13 have eight magnetic poles, and the stator iron core has twelve slots.

In this case, the skew angle θ which causes the cogging torque to be a minimum is approximately 10 degrees, and is approximately equal to 4/3 times the skew angle θ (of 7.5 degrees), which is determined based on the number of torque ripples per rotation of the rotor 1 determined by the number of slots in the stator-side iron core and the number of magnetic poles of the annular magnets. In other words, the angle obtained by adding to the skew angle θ a value which takes into consideration magnetic interference between the split annular pole magnets becomes the skew angle θ'.

Figure 7:
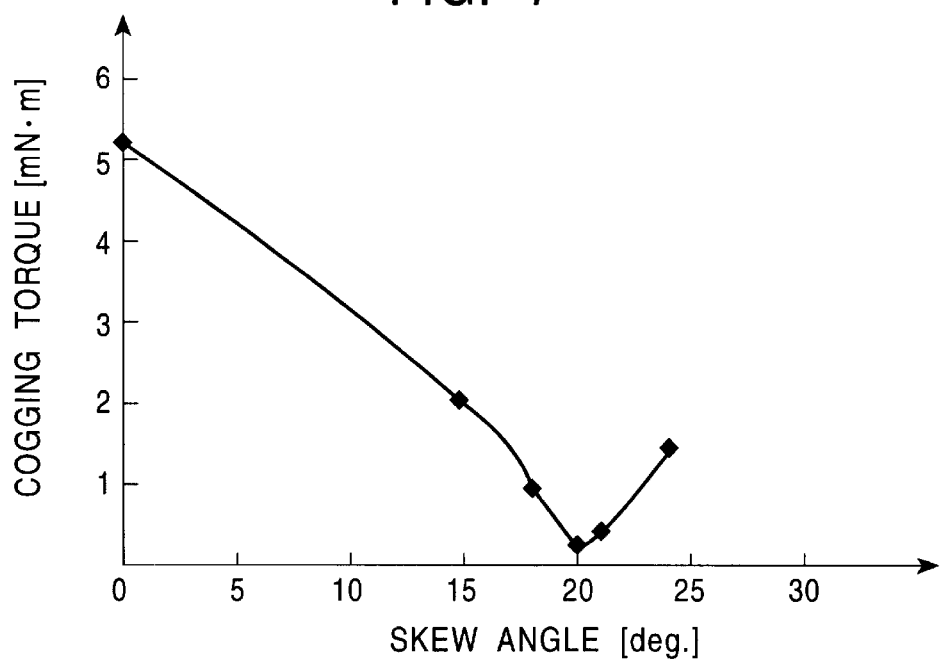
FIG. 7 is a graph showing the relationship between the cogging torque and the skew angle when the annular polar anisotropic magnets 16A and 16B, formed by splitting the magnet into two in the axial direction thereof, are used in the rotor 13. (Here, the number of magnetic poles is four, and the number of slots is eight.)

FIG. 7 is a graph showing the relationship between the cogging torque and the skew angle in the case where there are used the annular polar anisotropic magnets 16A and 16B, formed by splitting the anisotropic magnet into two in the axial line direction, when the number of magnetic poles is four and the number of slots in the stator iron core 12 is six.

In this case, the skew angle θ, which is determined based on the number of torque ripples per rotation of the rotor 1 determined by the number of slots in the stator-side iron core and the number of magnetic poles of the annular magnets (and which is equal to 12, which is the least common multiple of the number of magnetic poles and the number of slots), is 15 degrees, which corresponds to half the period of the cogging torque. On the other hand, the skew angle θ' which causes the cogging torque to be a minimum is approximately 20 degrees, which corresponds to approximately 4/3 times the skew angle θ illustrated in FIG. 7.

As can be seen from FIGS. 6 and 7, when an attempt is made to minimize the cogging torque by providing a skew angle at the magnetic poles of each of the annular polar anisotropic magnets in the servomotor 1 whose rotor uses the annular polar anisotropic magnets, formed by splitting the anisotropic magnet into two in the axial line direction thereof, the relationship that θ' approximately equals 4/3θ is established between the skew angle θ' and the skew angle θ which causes the cogging torques to be cancelled (that is, the cogging torques to have opposite phases), the skew angle θ being determined based on the number of torque ripples per rotation of the rotor 1 determined by the number of slots in the stator-side iron core and the number of magnetic poles of the rotor-side annular anisotropic magnets.

Although the embodiment has been described using in the rotor 13 the annular polar anisotropic magnets 16A and 16B, formed by splitting the anisotropic magnet into two in the axial direction thereof, the gist of the present invention is necessarily not limited to splitting the annular magnet into two. For example, as a means of causing the servomotor to provide high output, the overall length of the motor can be increased in the axial direction thereof, or the annular polar anisotropic magnet 16 can be split into three or more portions. Even in these cases, the operational effect of minimizing the cogging torque as in the above-described embodiment of the present invention can be achieved.

The present invention has been described in detail with reference to a particular embodiment. However, it is obvious that modifications and substitutions may be made by those skilled in the art without departing from the gist of the present invention. In other words, the present invention has been described in various forms for illustrative purposes only. Therefore, it is to be understood that the present invention is not limited thereto. In order to determine the gist of the present invention, one should refer to the claims of the present invention at the end of this document.

As described in detail above, according to the present invention, it is possible to provide an excellent AC servomotor usuable as an actuator of various industrial machines, including robots.

In addition, according to the present invention, it is possible to provide an excellent AC servo motor which is small and which provides a high output.

Further, according to the present invention, it is possible to provide an excellent AC servomotor using an anisotropic magnet in a rotor.

Still further, according to the present invention, it is possible to provide an excellent AC servomotor which can be controlled with high precision as a result of reducing cogging torque generated between the magnet and the iron core of the stator.

According to the AC servomotor of the present invention, even when an annular polar anisotropic magnet is used in the rotor, the cogging torque can be restricted to a minimum. More specifically, according to the present invention, it is possible to realize a servomotor having a small cogging torque and providing a high output.

As a result of restricting the cogging torque to a minimum, it is possible to provide an AC servomotor which is controllable with high precision. Such a servomotor which can provide high output and which is controllable with high precision can be used as a joint actuator in legged walking robots and other types of articulated robots. In particular, such a servomotor can contribute to the increasing of the performance of small robots.

What is claimed is:

1. An AC servo motor comprising:

a stator-side iron core having a plurality of slots; and a rotor comprising an annular polar anisotropic magnet that is split into two or more annular polar anisotropic magnets in an axial line direction thereof, wherein a cogging torque is minimized by determining a number of torque ripples per rotation of the rotor based on the number of magnetic poles of the annular polar anisotropic magnet and a number of slots in the stator-side iron core, calculating a skew angle $\theta'$ based on the number of torque ripples, determining an angle $\theta'$ by adding skew angle $\theta$ a value which accounts for magnetic interference occurring at the boundary between the split annular polar anisotropic magnets, and shifting the magnetic poles of the corresponding split annular polar anisotropic magnets by the predetermined angle $\theta'$.

2. An AC servomotor according to claim 1, wherein the skew angel $\theta$ is equal to half the period of a cogging torque which is determined based on the number of torque ripples per rotation of the rotor determined by the number of magnetic poles of the annular polar anisotropic magnet and the number of slots in the stator-side iron core.

3. An AC servomotor according to claim 1, wherein the predetermined angle $\theta'$ is approximately $4/3$ times the skew angle $\theta$ which corresponds to half the period of a cogging torque determined based on the number of torque ripples per rotation of the rotor determined by the number of magnetic poles of the annular polar anisotropic magnet and the number of slots in the stator-side iron core.

* * * * *